United States Patent [19]
Breckwoldt

[11] Patent Number: 5,166,332
[45] Date of Patent: Nov. 24, 1992

[54] ALKENYL METHYL HYDROXYPROPYL CELLULOSE ETHERS AND A PROCESS FOR THEIR PRODUCTION

[75] Inventor: Jörn Breckwoldt, Rotenburg, Fed. Rep. of Germany

[73] Assignee: Wolff Walsrode Aktiengesellschaft, Walsrode, Fed. Rep. of Germany

[21] Appl. No.: 695,680

[22] Filed: May 6, 1991

[30] Foreign Application Priority Data

May 11, 1990 [DE] Fed. Rep. of Germany ....... 4015158

[51] Int. Cl.$^5$ .................... C08B 11/00; C08B 11/193; C08B 11/08; C08B 11/02
[52] U.S. Cl. ........................................ 536/84; 536/90; 536/91; 536/95; 536/99; 536/124
[58] Field of Search ....................... 536/84, 90, 91, 95, 536/99, 124

[56] References Cited

U.S. PATENT DOCUMENTS

| | | | |
|---|---|---|---|
| 2,082,797 | 6/1937 | Hahn | 536/93 |
| 2,398,767 | 4/1946 | Burke | 536/93 |
| 4,550,161 | 10/1985 | Felcht et al. | 536/90 |
| 4,582,899 | 4/1986 | Nakamura | 536/84 |

FOREIGN PATENT DOCUMENTS

1418271 10/1968 Fed. Rep. of Germany .
1418921 10/1968 Fed. Rep. of Germany .

*Primary Examiner*—Nathan M. Nutter
*Attorney, Agent, or Firm*—Sprung Horn Kramer & Woods

[57] ABSTRACT

New alkenyl methyl hydroxypropyl cellulose ethers have an average degree of substitution DS with methyl groups of 1.5 to 2.9, a molar degree of substitution MS with hydroxypropyl groups of 1.4 to 1.9 and an average degree of substitution DS with alkenyl groups of 0.05 to 1.

6 Claims, No Drawings

ALKENYL METHYL HYDROXYPROPYL CELLULOSE ETHERS AND A PROCESS FOR THEIR PRODUCTION

This invention relates to polymerizable alkenyl methyl hydroxypropyl cellulose ethers which are soluble in organic solvents.

Polymerizable cellulose ethers which are soluble in organic solvents are of advantage for processing and applicational purposes.

Allyl cellulose (AC), allyl hydroxyethyl cellulose (AHEC), methallyl cellulose (MAC) and crotonyl cellulose are described in the patent literature. Ketones, esters and aromatic hydrocarbons are generally mentioned as organic solvents (see U.S. Pat. No. 2,232,927, U.S. Pat. No. 2,406,369, DE-PS 1 065 828, DE-A 1 418 271, U.S. Pat. No. 2,082,797 and U.S. Pat. No. 2,398,767).

The products all have a high degree of substitution with regard to the unsaturated group. Accordingly, the cellulose ethers lose their solubility after only a short time in organic solvents, but also in bulk. Polymerization is initiated by light, heat and oxygen. A major disadvantage of all known processes is the poor yield of chemicals, based on the unsaturated halide, which is normally between 10 and 20%.

The problem addressed by the present invention was to provide organosoluble polymerizable cellulose ethers having a long storage life.

Another problem addressed by the invention was to provide a production process having a high yield of chemicals.

The present invention relates to polymerizable cellulose ethers which are soluble in organic solvents, characterized in that the average degree of substitution DS with methyl groups (DS methyl) is 1.5 to 2.9, the molar degree of substitution MS (MS hydroxypropyl) with hydroxypropyl groups is 1.4 to 1.9 and the average degree of substitution DS with alkenyl groups (DS alkenyl) is preferably 0.05 to 1.

In one preferred embodiment, at least 2 g/100 g solvent of the cellulose ethers dissolve in polar organic solvents at 25° C. to form a clear solution. Polar organic solvents are understood to be organic solvents bearing polar groups in the molecule in which the heteroatoms nitrogen, sulfur and oxygen are preferably present.

Preferred polar groups are:

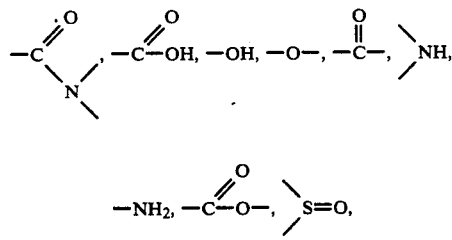

A typical polar organic solvent is ethanol.

It is in the nature of polymers that a "saturated" solution of the cellulose ether is impossible to prepare because any increase in concentration is accompanied for each type of viscosity by an increase in the solution viscosity which finds its limit in technical processability.

The present invention also relates to a process for the production of the alkenyl methyl hydroxypropyl cellulose ethers according to the invention by
 a) formation of an alkali cellulose by reaction of cellulose with alkali
 b) reaction of the alkali cellulose with a compound transferring hydroxypropyl groups and an unsaturated alkylating agent RX and subsequent
 c) methoxylation after the hydroxypropylation by addition of a methylating agent.

A compound corresponding to the formula

RX in which
X is an anion-forming moiety, preferably Cl, Br, $OSO_3R$
R is an alkenyl radical, more particularly

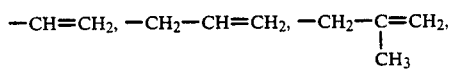

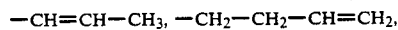

$-CH_2-CH=CH-CH_3$, preferably

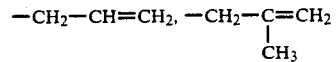

is preferably used as the unsaturated alkylating agent.

Ground celluloses, such as bleached linters or chemical wood pulp, are used as starting material for the process according to the invention. The viscosity stages of the products can be established through the choice of the celluloses which have a corresponding average degree of polymerization. Low-viscosity products can be obtained by using celluloses which have been oxidatively degraded by standard methods.

The alkalization of the cellulose and its subsequent etherification may be carried out in the presence of organic solvents in a ratio by weight of solvent to cellulose of preferably 2.5:1 in order to avoid local overheating and to obtain uniformly etherified products. Suitable organic solvents are lower alcohols preferably containing 2 to 4 carbon atoms per molecule and also ethers preferably containing 2 to 4 carbon atoms per molecule or mixtures of these solvents.

For alkalization, the cellulose is sprayed with sodium hydroxide having a concentration of 20 to 50% by weight and preferably 40 to 50% by weight in a quantity of not less than 1.6 mol sodium hydroxide per mol cellulose. According to the invention, the hydroxyalkylating agent and the alkylating agent RX is added either before addition of the sodium hydroxide or after the alkalization phase. For etherification, the reaction mixture is heated to temperatures of 50° to 100° C. and preferably to temperatures of 70° to 90° C. and the temperature level adjusted is maintained until the reaction is complete. Before the methylating agent is added, the reaction mixture is cooled, preferably to temperatures below 50° C., and more sodium hydroxide is optionally added. The reaction mixture is then reheated to temperatures of 50° to 100° C. and preferably 70° to 90° C. and the etherification reaction is carried out at that temperature over a period of 1 to 5 hours and preferably over a period of 1.5 to 3 hours. Where an excess of methyl chloride of preferably 6 to 12 mol per mol cellulose is used, a maximum pressure of 18 to 20 bar is established, so that the reaction is carried out in pressure reactors.

In the case of the nonionic derivatives, the crude products thus obtained may be purified by washing with hot water because they have a thermal flocculation point.

The insolubility of the crude products in hot water enables them to be purified with water to a low ash content by comparison with purification using aqueous organic solvents which not only have the disadvantages that they are too expensive, they also complicate the process because they have to be recovered. In addition, it is not possible, even with large quantities of organic solvent, to obtain as low an ash content as with hot water.

An alkenyl methyl hydroxypropyl cellulose having a methoxyl DS of 1.5 to 2.9 and preferably 2.5 to 2.6, a hydroxypropyl MS of 1.4 to 1.9 and preferably 1.5 to 1.7 and an alkenyl DS of 0.05 to 1 and preferably 0.1 to 0.3, the alkenyl radical preferably representing the allyl or methallyl substituent, is surprisingly distinguished by the following properties:

1. solubility in cold water (temperature $<4°$ C.),
2. insolubility in hot water,
3. solubility in a number of polar organic solvents,
4. polymerizability,
5. stability in storage.

In the case of the cellulose ethers according to the invention, the abbreviations DS and MS (degree of substitution, molar degree of substitution) have the usual meanings:

Three hydroxyl groups are present in each anhydroglucose unit in the cellulose molecule.

DS is the average number of hydroxyl groups substituted in the cellulose per anhydroglucose unit, MS is the average number of mols of the reactant combined with the cellulose per anhydroglucose unit.

Propylene oxide is the particularly preferred agent for transferring hydroxypropyl groups, although propylene chlorohydrin may also be used.

Particularly preferred methylating agents are methyl chloride and also dimethyl sulfate, methyl bromide, methyl iodide, methane sulfonic acid methyl ester, benzyl-4-sulfonic acid methyl ester, toluene-4-sulfonic acid methyl ester, trifluoromethane sulfonic acid methyl ester.

The cellulose ethers produced in accordance with the invention are soluble in a number of organic solvents. Preferred organic solvents are aliphatic and cycloaliphatic alcohols, such as methanol, ethanol, isopropanol (water content 20%), tert. butanol (water content 10%); aliphatic and cycloaliphatic ethers, such as 1,4-dioxane, tetrahydrofuran; carboxylic acids, such as acetic acid; chlorinated hydrocarbons, such as chloroform, methylene chloride; amines, such as pyridine; amides, such as dimethyl formamide; sulfur-containing organic solvents, such as dimethyl sulfoxide, and aromatic hydrocarbons in conjunction with aliphatic alcohols, such as toluene/ethanol (80/20).

The cellulose ethers produced in accordance with the invention show good film formation. The films are transparent, highly flexible and are insoluble in oils and fats and in gasoline. The films are dissolved by aqueous systems (acids, alkalis) and by a number of organic solvents (see solubility behavior of the cellulose ethers). Films of the alkenyl methyl hydroxypropyl cellulose can become insoluble if the double bond present is crosslinked. This can be initiated by UV light. The films do not discolor. Thermal initiation is not possible.

The solubility of the cellulose ethers according to the invention in organic solvents, more particularly in lower alcohols, may be used for thickening cosmetic articles, lotions, perfumes, etc.; in pickling pastes and in certain printing inks.

In the alkenyl methyl hydroxypropyl celluloses produced in accordance with the invention, double bonds have been introduced into the cellulose chain and may be used as active centers in subsequent reactions. The double bonds may be used for addition reactions, including both ion reactions and also radical reactions.

By virtue of their homopolymerizability or copolymerizability with unsaturated compounds, the alkenyl methyl hydroxypropyl celluloses may be used for the production of paint ingredients, coatings and water-absorbing materials.

The alkenyl methyl hydroxypropyl cellulose is particularly suitable for coatings of papers and other substrates because it can be homopolymerized by UV light without any effect on its transparency. The properties of the coatings can be modified by copolymerization with vinyl monomers, more particularly acrylates and/or methacrylates.

Flame-resistant coatings for papers and fabrics can be obtained by 1. copolymerization with alkenyl phosphorus compounds 2. addition of Si-H and P-H compounds onto the double bond. Such materials are of considerable interest for decorative purposes and for stage scenery.

EXAMPLE 1

Methyl Hydroxypropyl Methallyl Cellulose (MHPMAC)

In a 2 liter pressure autoclave purged with inert gas, 121.5 g finely ground chemical wood pulp are alkalized with 120 g 50% sodium hydroxide for 60 minutes at room temperature. 152 g propylene oxide and 47 g methallyl chloride are then added to the alkali cellulose. The temperature in the autoclave is increased to 90° C. After an etherification time of 3 hours, the reactor is cooled and 12 mol methyl chloride per mol cellulose and 180 g sodium hydroxide (prills) are added. The reaction mixture is then heated to 80° C. and methoxylated for 4 hours. After cooling, the MHPMAC is washed with hot water and dried. The MHPMAC formed has the following degrees of substitution:

DS (OMe): 2.47
DS (OMa): 0.25
MS (HP): 1.65.

The yield of chemicals, based on methallyl chloride, is 36%.

Solubility

The cellulose ethers according to the invention are soluble in a number of organic solvents. To determine solubility, the solvent to be tested was added to 0.6 g of the cellulose ether in a test tube up to a total weight of 30 g. After a residence time of 24 hours on a shaking apparatus, the level of solubility was determined. The superiority of the cellulose ethers according to the invention to other methyl hydroxypropyl celluloses described as organosoluble is clearly apparent from Table 1.

TABLE 1

| Cellulose ether | Solubilities in EtOH | | Solubility in ethanol |
|---|---|---|---|
| | DS | MS | |
| MHPMAC (invention) | 2.47/0.25 | 1.65 | Soluble |
| MHPC (claim US 2,614,545) | 1.6 | 0.4 | Insoluble |
| MHPC (claim US 4,614,545 corresponding to Example) | 2.12 | 0.82 | Highly swollen |

The new cellulose ethers show good film formation. To prepare films, a 10% solution of the cellulose ether in ethanol was prepared. Using a hand caster, films were cast onto glass plates, dried for 1 hour at 50° C. in a recirculating air drying cabinet and removed from the glass plate. The films are clear, highly flexible and are insoluble in oil and gasoline. If the films of an alkenyl methyl hydroxypropyl cellulose are exposed to UV irradiation, the unsaturated groups are crosslinked by homopolymerization. The films thus become insoluble in organic solvents. The unsaturated groups are also accessible to copolymerization, more particularly with acrylate and/or methacrylates.

The mechanical strengths of the films were determined in accordance with DIN 53 455. The tensile tests were carried out using a Franck-Universal 81565.553 testing machine manufactured by Karl Franck GmbH, Weinheim/Birkenau. The advantages, particularly of the MHPMAC according to the invention, are shown in Table 2.

TABLE 2

Mechanical strengths of water-soluble cellulose ether films

| Cellose ether | DS | MS | Tensile strength [N/mm$^2$] | Elongation at break [%] | E modulus [N/mm$^2$] |
|---|---|---|---|---|---|
| CMC | 0.9 | | 37.3 | 10.9 | 35.1 |
| MHEC | 1.4 | 0.2 | 35.3 | 26.3 | 34.6 |
| HEC* | | 2.5 | 28 | 15–40 | |
| HPC* | | 4 | 14 | 56 | |
| MHPMAC (invention) | 2.47/0.25 | 1.65 | 17.2 | 38.4 | 35.9 |

*Taken from: E. D. Klug, J. Polymer Sci., Part C, 36 (1977), page 491.

I claim:

1. A polymerizable methyl hydroxypropyl cellulose ether having an average methyl group degree of substitution DS of 1.5 to 2.9, a hydroxypropyl group molar degree of substitution MS of 1.4 to 1.9 and containing polymerizable alkenyl groups selected from the group consisting of

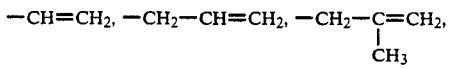

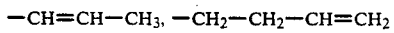

and

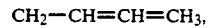

the ether being soluble in cold water, insoluble in hot water and soluble in at least one of alcohols, ethers, acids, chlorinated hydrocarbons, amines, amides, sulfur-containing organic solvents, and aromatic hydrocarbons in conjunction with aliphatic alcohols.

2. A cellulose ether according to claim 1, having an average DS of alkenyl groups of 0.005 to 1.

3. A cellulose ether according to claim 1, wherein the methyl group DS is 2.5 to 2.6.

4. A cellulose ether according to claim 1, wherein the hydroxypropyl MS is 1.5 to 1.7.

5. A film or coating formed of a cellulose ether according to claim 1.

6. A cellulose ether according to claim 2, wherein the methyl group DS is 2.5 to 2.6, the hydroxypropyl MS is 1.5 to 1.7 and the ether is soluble in ethanol.

* * * * *